(12) United States Patent
Scott et al.

(10) Patent No.: US 8,966,810 B2
(45) Date of Patent: Mar. 3, 2015

(54) FISH LURE

(76) Inventors: Jason E. Scott, Tucson, AZ (US);
Robert E. Scott, Tucson, AZ (US)

(*) Notice: Subject to any disclaimer, the term of this patent is extended or adjusted under 35 U.S.C. 154(b) by 579 days.

(21) Appl. No.: 13/252,628

(22) Filed: Oct. 4, 2011

(65) Prior Publication Data

US 2013/0081319 A1    Apr. 4, 2013

(51) Int. Cl.
*A01K 85/16*    (2006.01)
*A01K 85/00*    (2006.01)

(52) U.S. Cl.
CPC ..................................... *A01K 85/00* (2013.01)
USPC .................... 43/42.03; 43/42.22; 43/42.24

(58) Field of Classification Search
USPC .............. 43/42.03, 42.1, 42.22, 42.24, 42.28; D22/126, 133
See application file for complete search history.

(56) References Cited

U.S. PATENT DOCUMENTS

| | | | | | |
|---|---|---|---|---|---|
| 2,149,054 | A | * | 2/1939 | Jones | 43/42.22 |
| 2,847,791 | A | * | 8/1958 | Simmons | 43/42.26 |
| 3,199,244 | A | * | 8/1965 | Frederiksen, Sr. | 43/42.1 |
| 3,218,750 | A | * | 11/1965 | Lewin | 43/42.28 |
| 3,879,882 | A | * | 4/1975 | Rask | 43/42.28 |
| D299,263 | S | * | 1/1989 | James | D22/133 |
| 5,193,299 | A | * | 3/1993 | Correll et al. | 43/42.47 |
| 6,393,755 | B1 | * | 5/2002 | Weaver | 43/42.03 |
| 6,857,220 | B2 | * | 2/2005 | King | 43/42.28 |
| 7,080,476 | B2 | * | 7/2006 | King | 43/42.28 |
| 7,322,151 | B2 | * | 1/2008 | Guigo et al. | 43/42.26 |
| 7,627,979 | B2 | * | 12/2009 | Huddleston | 43/42.24 |
| 7,743,550 | B2 | * | 6/2010 | Huddleston | 43/42.22 |
| D660,397 | S | * | 5/2012 | King | D22/133 |

* cited by examiner

*Primary Examiner* — David Parsley

(57) ABSTRACT

Fish lure includes a flexible body having a forward body having maximum width and weight tapering to an aft body having reduced width and height; and a swimming tail portion flexibly connected to the aft body, wherein the swimming tail is flared, wherein the tail increases in width and height toward a tail tip as compared with the aft body portion, and a central channel groove generally parallel to a long axis of the lure, the long axis being normal to both width and height of the lure, the channel groove extending to the tail tip and maintaining a smaller width dimension as compared to adjacent flared portions of the tail, wherein water flow across the tail is guided through the channel groove and across the flared portions of the tail to provide vertically-balanced water flow across the tail and to produce a uniform horizontal swimming movement of the tail.

13 Claims, 4 Drawing Sheets

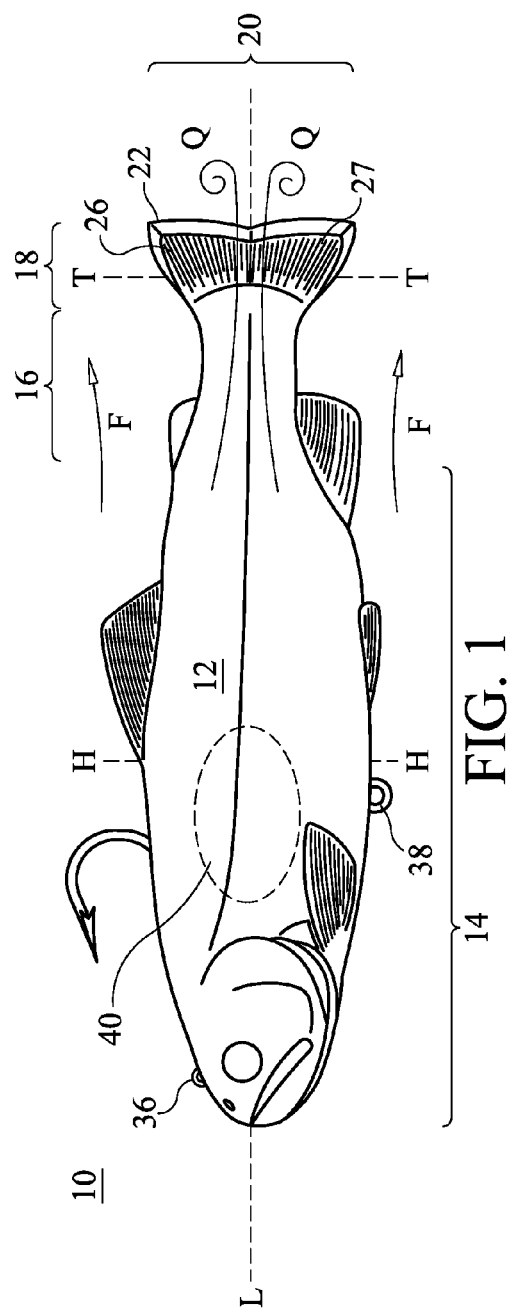
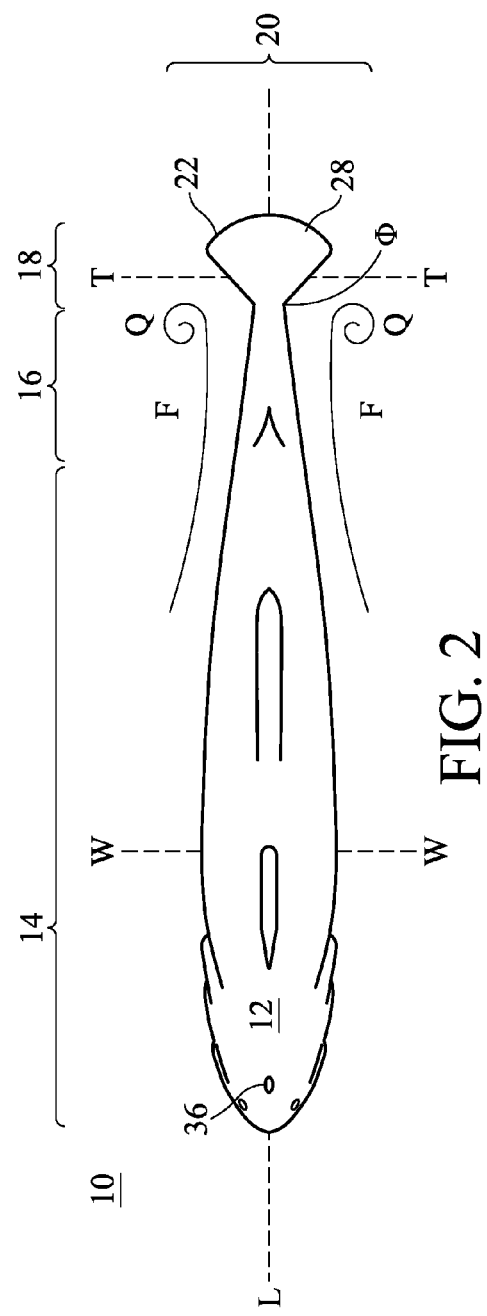

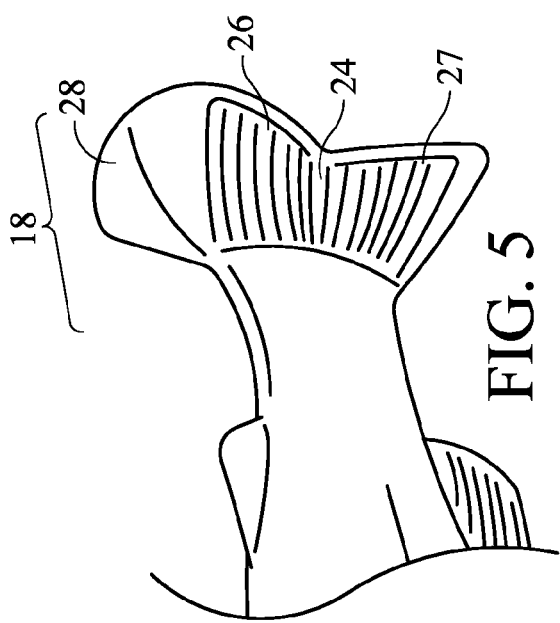
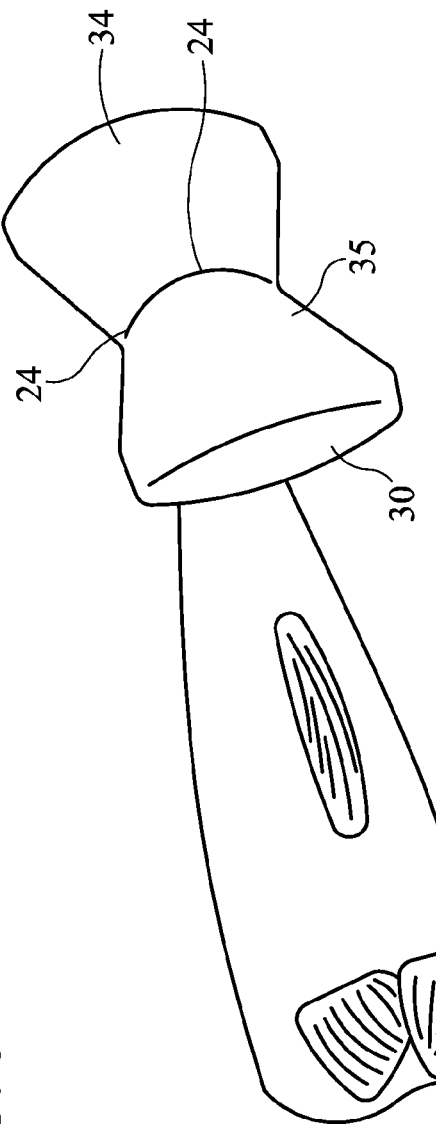

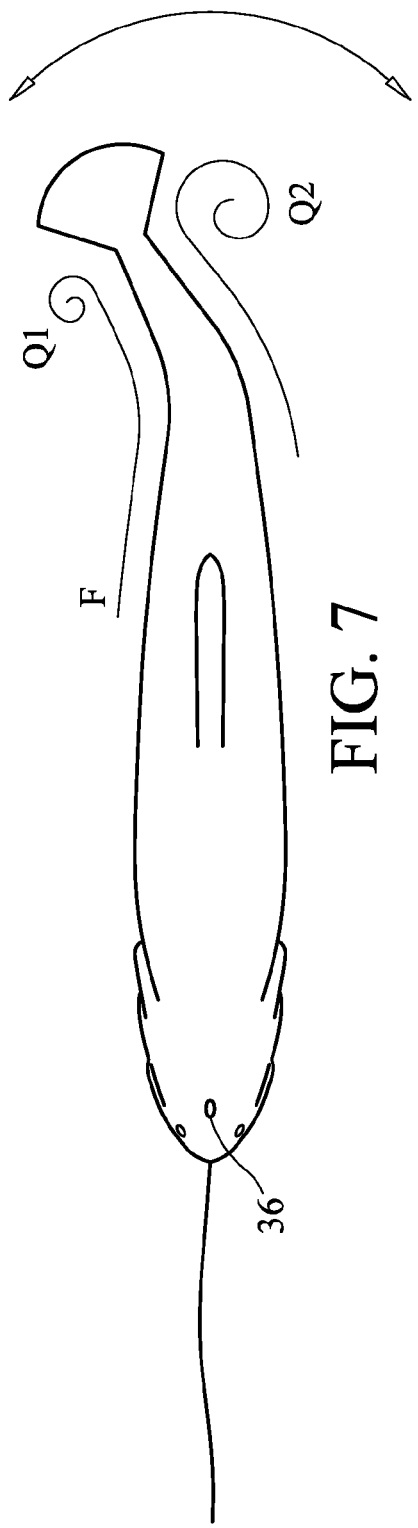
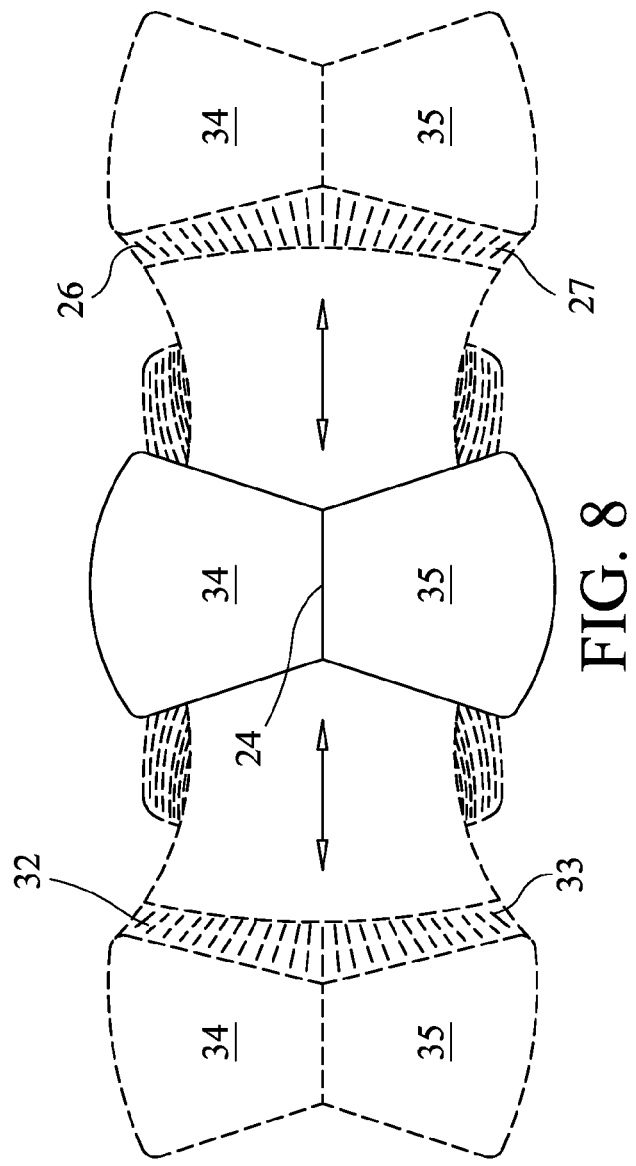

FISH LURE

FIELD OF THE INVENTION

The present invention relates generally to the field of fish lures and more particularly to a swimming fish lure.

BACKGROUND OF THE INVENTION

Since the advent of modem angling, man has understood that the best baits and lures for fishing have very natural qualities. Some of these qualities are relatively easy to duplicate. Color and shape are particularly straightforward for a bait manufacturer to duplicate from the natural world. Scent and taste have long been understood to be important for many species of game fish. However, lifelike motion has been an elusive objective. Numerous efforts have been made to create lures that move naturally. The results have been mixed. In some cases, bills or lips are attached to lure bodies to force the lure body to shake and vibrate. This motion is said to imitate a wounded fish, which is said to trigger a strike response from a game fish. Later, wire joints were added to those rigid lures to provide a bit of flexibility. However, little to no success has been achieved to create a bait or lure that "swims" like a "normal" fish.

Thus, what is desired is a fishing lure that is constructed to provide a smooth, natural swimming motion as it moves through the water.

SUMMARY OF INVENTION

A fishing lure including a soft, flexible fish-shaped body having a forward body portion having a maximum width and maximum height which tapers to an aft body portion having a width and height that are reduced compared with the maximum width and height of the forward body portion; and a swimming tail portion flexibly connected to the aft body portion, wherein the swimming tail includes a flared configuration, wherein the tail increases in width and height toward a tail tip as compared with the aft body portion, and having a central channel groove generally parallel to a long axis of the lure, the long axis being normal to both a width and height of the lure, the channel groove extending to the tail tip and maintaining a smaller width dimension as compared to adjacent flared portions of the tail, wherein water flow across the tail is guided through the central channel groove and across the flared portions of the tail to provide vertically-balanced water flow across the tail and to produce a uniform horizontal swimming movement of the tail.

The central channel groove guides the water flow across both sides of the tail of the fishing lure in a controlled manner, and serves to balance the multiple and competing dynamic influences of the water flow to eliminate the unnecessary and undesirable vertical movement components of the tail. This provides a more natural and balanced tail movement in only a horizontal plane. Thus the rhythmic horizontal movements of the tail make it appear that the fishing lure is swimming is a very lifelike and realistic manner.

This arrangement provides a significant advantage over the prior art arrangements, wherein the lures' tails are simply blocky, bulbous or rounded structures which do exhibit a side-to-side motion, but which motion includes unnatural and unwanted vertical components.

In one embodiment, the channel groove increases in width toward the tail tip while maintaining a smaller width dimension as compared to adjacent flared portions of the tail. The slight widening or flaring of the channel groove portion of the tail helps to maintain the desired relative proportions of the tail, which reinforces the realistic, lifelike appearance of the fishing lure.

In a further embodiment, all surfaces of the tail portion are rounded and blended together. This serves to ease manufacturing and release of the fishing lures from the molds.

In one embodiment, the tail portion comprises a plurality of faces. In a further embodiment, the tail includes a right pair of lateral faces and a left pair of lateral faces, each pair of faces joined at an angle at the central channel groove, and each pair of faces including an upper face and a lower face. Each lateral face may be generally planar. The plurality of faces helps to positively define the central channel groove and the adjacent tail structures. This in turn makes it easier to accurately tune the fishing lure and its tail for optimal realistic, lifelike movements, without unwanted and unnecessary vertical movement components.

In another embodiment, the upper lateral faces are connected across a top of the tail by a dorsal face. In a further embodiment, the lower lateral faces are connected across a bottom of the tail by a ventral face. The dorsal face and the ventral face serve to permit accurate, selective tuning of the lure's motions and movements by careful adjustments to the relative angles of the dorsal and ventral faces. This in turn compensates for uneven water flow across the top of the fishing lure as compared with water flow across the bottom of the fishing lure for the purpose of eliminating unwanted and unnecessary vertical components of the lure's movements.

In another embodiment, the upper lateral faces are connected across an upper tail tip by an upper tip face. In a further embodiment, the lower lateral faces are connected across a lower tail tip by a lower tip face. In another embodiment, the upper and lower lateral faces are connected across a tail tip by a combined tip face. The combined tip face may be rounded. The upper tip face may be distinct from the lower tip face, or they may be combined into a single combined tip face in order to promote selective laminar or non-laminar flow and to encourage the pure horizontal movements of the tail.

In a further aspect of the invention, a fishing lure comprises a soft, flexible fish-shaped body having a forward body portion having a maximum width and maximum height which tapers to an aft body portion having a width and height that are reduced compared with the maximum width and height of the forward body portion; and a swimming tail portion flexibly connected to the aft body portion, wherein the swimming tail includes a flared configuration, wherein the tail increases in width and height toward a tail tip as compared with the aft body portion, and a central channel groove generally parallel to a long axis of the lure, the long axis being normal to both a width and height of the lure, the channel groove extending to the tail tip and maintaining a smaller width dimension as compared to adjacent flared portions of the tail, wherein water flow across the tail is guided by the central channel groove across the flared portions of the tail to provide vertically-balanced water flow across the tail and produce a uniform horizontal swimming movement of the tail, wherein the tail portion comprises a plurality of faces, including a right pair of lateral faces and a left pair of lateral faces, each pair of faces joined at an angle at the central channel groove, and each pair of faces including an upper face and a lower face.

In another embodiment, the body and tail are formed as a single piece of a flexible homogenous material. This provides the advantage of a strong, jointless fishing lure that looks and feels like a real fish.

In a further embodiment, the fishing lure further includes a buoyancy insert inside the body portion. The buoyancy insert provides the advantage of selective positive, negative or neutral buoyancy. A negative buoyancy means that the fishing lure has an overall density greater than the water it is being fishing in, and that it will sink. The rate of sinking can be generally determined at the time of manufacturing, based on typical fresh- or salt-water fishing environments. The buoyancy insert can also be arranged to determine and control the overall center of gravity of the fishing lure so that, even if the lure is sinking, the attitude of the fishing lure remains in a desired orientation, such as level or slightly nose-down.

In another embodiment, the fishing lure further includes a fishing line eye in a forward portion of the body. This provides a convenient point to attach a fishing line, and serves to draw the fishing lure through the body from a point on the fishing lure body that encourages the optimal horizontal motion of the tail, without unwanted vertical movements.

In a further embodiment, the fishing lure further includes a fish hook eye connected to the fishing line eye. The fish hook eye provides a point for the attachment of a fish hook. The position and orientation of the fish hook eye may be selected so as to minimize or eliminate interference with the movement of the fishing lure through the water, and that encourages the optimal motion of the tail, without unwanted vertical movements.

BRIEF DESCRIPTION OF THE DRAWINGS

FIG. 1 illustrates a side view of a fishing lure, in accordance with the present invention;

FIG. 2 illustrates a top view of the fishing lure, in accordance with the present invention;

FIG. 5 illustrates a perspective view of a tail for a fishing lure, according to the present invention;

FIG. 6 illustrates a lower perspective view of a fishing lure, according to the present invention;

FIG. 7 illustrates a top view of a fishing lure in motion, according to the present invention; and FIG. 8 illustrates a rear view of the fishing lure tail in motion, according to the present invention.

DETAILED DESCRIPTION OF THE DRAWINGS

Figure 3A:
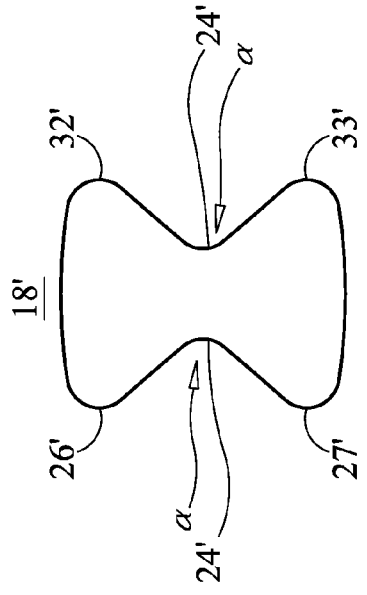
FIGS. 3a-3b illustrate section views of the fishing lure of FIGS. 1 and 2 along plane t-t, in accordance with the present invention.

FIGS. 1-4 illustrate a flexible fishing lure 10 having a soft, fish-shaped body 12. The body 12 includes a forward body portion 14 and an aft body portion 16 with a tail portion 18 connected to the aft body portion 16. The forward body portion 14 has a maximum width along axis W and a maximum height along axis H, and the maximum width and height of the forward body portion 14 taper to the aft body portion 16 having a width and height that are reduced compared with the maximum width and height of the forward body portion 14. This arrangement is similar to a natural fish. A swimming tail portion 18 is flexibly connected to the aft body portion 16, and the swimming tail 18 includes a flared configuration 20, wherein the tail 18 increases in width and height toward a tail tip 22 as compared with the aft body portion 16. The flaring 20 of the tail 18 is along both the width W and height H axes, as illustrated in FIGS. 1 and 2.

A central channel groove 24 is located on the tail 18, and is generally parallel to a long axis L of the lure, the long axis L being normal to both the width W and height H axes of the lure 10. The angle of the channel groove 24 may vary from being exactly normal to the width. W and height H of the lure 10 in order to introduce particular performance characteristics of the lure 10. The channel groove 24 extends from the aft body portion 16 to the tail tip 22 and maintains a smaller width dimension as compared to adjacent flared 20 portions of the tail 18. The channel groove 24 provides an important function in that water flow F across the tail 18 is guided through the central channel groove 24 and then across the flared portions 20 of the tail 18 to provide vertically-balanced water flow across the tail 18 and to thereby produce a uniform horizontal swimming movement of the tail 18. The balanced water flow was confirmed in testing. The channel groove 24 is illustrated in FIGS. 3a-3b, which show sectional views of the tail 18, 18' along the plane corresponding to lines t-t in both FIGS. 1 and 2.

As discussed above, prior art fishing lures exhibit a significant amount of vertical tail movement, due to the failure to guide the water flow across the lure in a directed manner. Prior art lures include body and tail shapes which encourage lure movement, but they fail to provide a structured arrangement which tightly controls and defines the movement so as to appear more lifelike.

In one embodiment, see FIG. 3a, the channel groove 24 maintains the effective width of the aft body portion 16 all the way through the tail 18 to the tip 22. In a further embodiment, the channel groove 24 increases in width toward the tail tip 22 while maintaining a smaller width dimension as compared to adjacent flared portions 20 of the tail 18. In another embodiment, see FIG. 3b, the surfaces of the tail portion 18' are rounded and blended together while maintaining the channel groove 24 in a defined manner.

Figure 3B:
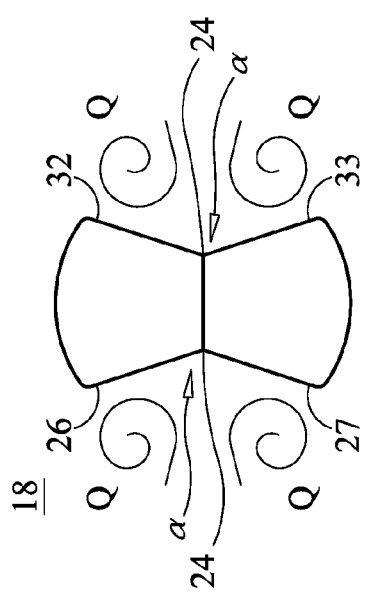

FIGS. 3a-3b illustrate that the tail portion 18; 18' includes a plurality of faces 26, 27, 32, 33; 26', 27', 32' 33'. In one embodiment, the tail 18; 18' includes a right pair of lateral faces 26, 27; 26' 27' and a left pair of lateral faces 32, 33; 32' 33', each pair of faces 26, 27; 32, 33; 26', 27', 32' 33' joined at an angle ∀ at, and corresponding to, the central channel groove 24; 24'. Each pair of faces 26, 27; 32, 33; 26', 27', 32' 33' includes an upper face 26, 32; 26' 32' and a lower face 27, 33; 27' 33', respectively. Each of the faces 26, 27, 32, 33; 26', 27', 32' 33' may be generally planar.

The angle ∀ between the pairs of lateral faces 26, 27; 32, 33; 26', 27', 32' 33' may be manipulated to enhance the control of the water flow F across the tail. Angles may be selected based on the desired control characteristics, e.g., 70°-80°, 80°-90°, 100°-110°, 110°-120°, 120°-130°, 130°-140°, 140°-150°, 150°-160°, 160°-170°. Angles smaller that a right angle may be more aggressive in controlling water flow, but may be too restrictive to allow enough water through the channel groove 24 to control the lure optimally. Angles that are too large may not provide enough control as well.

Figure 4:
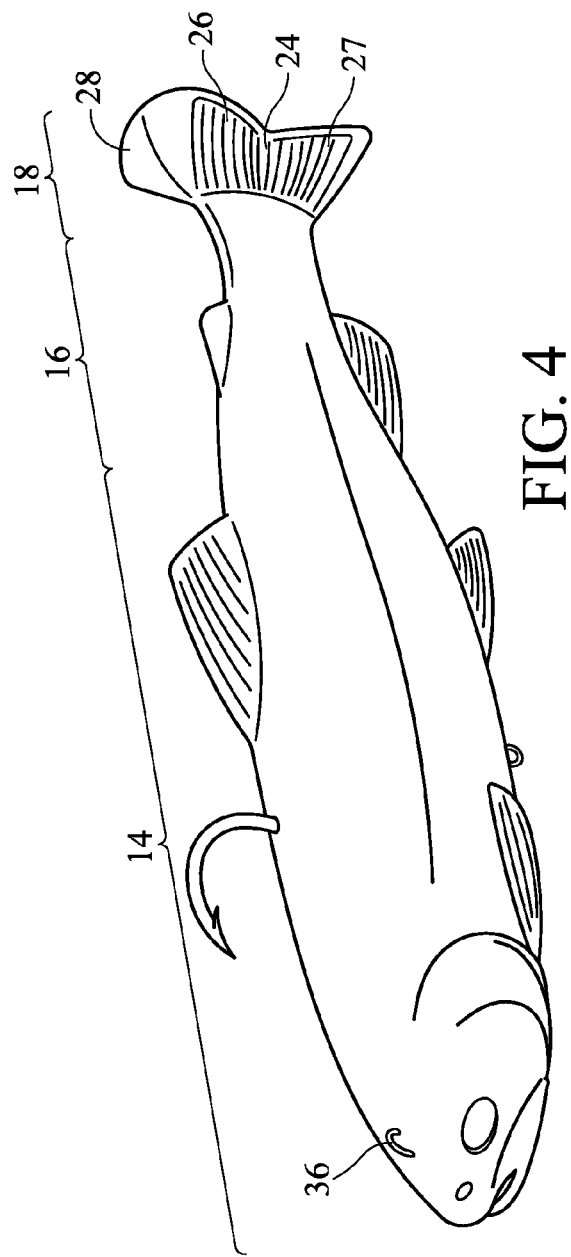
FIG. 4 illustrates an elevated perspective view of a fishing lure, in accordance with the present invention.

As illustrated in FIGS. 4-5, in one embodiment, the upper lateral faces 26, 32 may be connected across a top of the tail 18 by a dorsal face 28. In another embodiment, as illustrated in FIG. 6, the lower lateral faces 27, 33 may be connected across a bottom of the tail 18 by a ventral face 30.

As illustrated in FIG. 6, the upper lateral faces 26, 32 may be connected across an upper half of the tail tip 22 by an upper tip face 34. In a corresponding manner, the lower lateral faces 27, 33 may be connected across a lower half of the tail tip 22 by a lower tip face 35. As can be seen in FIGS. 4-6, the upper tip face 34 and the lower tip face 35 may be delineated as separate and distinct faces. They may be separated by an indentation that corresponds to a continuation of the channel groove 24, which is best seen in FIG. 6. In another embodiment, the upper and lower lateral faces 26, 27, 32, 33 may be connected across a tail tip 22 by a combined tip face which may have a uniform shape, such as the rounded shape seen in the upper profile of the tail tip 22 of FIG. 2.

Of course each of the features disclosed herein may be mixed and matched with other features to achieve the desired lure configuration for maximum control of water flow across the surface of the lure 10, and to produce thereby the most realistic swimming motion of the lure 10.

According to another embodiment, the body 14, 16 and tail 18 are formed as a single piece of a flexible homogenous material. Such materials include silicone rubber and other strong flexible materials suitable for the purpose of creating a swimming fishing lure. The swimming fishing lure 10 may include a buoyancy insert 40 inside the body portion 14, 16, and a fishing line eye 36 may be included in a forward portion 14 of the body 12. A fish hook eye 38 may be connected to the fishing line eye. Exact placement of the fishing line eye 36 and fish hook eye 38 may be adjusted to encourage a particular orientation or attitude of the body 12 as it is drawn through the water.

FIGS. 7 and 8 illustrate how the lure 10 swims, that is, how the tail functions as the lure 10 is drawn through the water. As stated above, the lure 10 includes a body 12 having a forward body portion 14, aft body portion 16 and tail 18. The body 12 is soft and flexible so as to permit controlled amounts of flexibility and to thereby mimic the movements of a real fish as a result of hydrodynamic forces acting on various surfaces of the lure 10.

As the water flow F passes across the forward body 14 and the aft body 16 toward the tail 18, water is guided into the channel groove 24. The channel groove 24 is generally horizontally oriented and serves to control the flow F across the tail 18, and to thereby control the movements of the tail 18 so as to create lifelike horizontal movements, without unwanted, unnatural vertical components of the motion. The placement of the line eye 36 may be balanced with the angle of the channel grooves 24 and/or the orientation and density of the buoyancy insert 40 to further refine and encourage purely horizontal motion of the tail 18, and more realistic, lifelike action of the lure 10. As illustrated in FIGS. 1-2, water flow F across the top and bottom of the lure 10 will be drawn into the taper of the body 12 at the aft body portion 16, which speeds up the water flow F in the area of the aft body 16. As illustrated in FIG. 1, water flow F across the top and bottom of the tail 18 is guided by the upper and lower surfaces of the tail 18, e.g., dorsal face 28 and ventral face 30. Such faces 28, 30 may be angularly defined to promote a particular orientation of the body 12 as it is drawn through the water.

As illustrated in FIGS. 1-3, a high-speed eddy or swirl Q occurs adjacent the flared 20 portions of the tail 18, and the lateral tail faces 26, 27, 32, 33. This swirl may have a lower pressure than the surrounding water, and any laminar flow. This low-pressure condition directly affects the behavior and movements of the lure 10 as it is drawn through the water.

The lure 10 is generally symmetrical with respect to the left and right sides, so there is a natural balance to the lure 10 which the lure 10 is trying to achieve, but which is never attainable, due to hydrodynamic influences. Therefore, one side of the lure 10 will always be working against the other side. As the lure is started, localized disturbances in the water around the lure 10, or irregularities in the lure body 12, such as a slight bend which may be a result of the lure 10 being cast into the water, will tend to favor one side of the lure 10 over the other side. This disturbance starts the swimming process, which is the regular, cyclical horizontal movement of the tail 18 in an arc, as illustrated in FIGS. 7-8.

FIG. 7 illustrates the affect of the eddies or swirls Q on the movement of the tail 18. As discussed above, one side of the lure will be favored initially, but this may be simply random chance, and is not important to the overall function of the lure 10. As one side of the tail 18 is curved closer to the forward body portion 14 of the lure, the relative angle-of-attack or angle of incidence between the water flow and the aft body 16 and tail 18 increases. This increase in the angle-of-attack forces the water flow F to move faster on that side of the lure 10, which in turn results in a lower water pressure eddy or swirl Q1 adjacent the tail 18. Thus the tail 18 acts as a small hydrofoil. On the opposite side of the lure 10, a contrary balancing force Q2 is being developed. In particular, the relative angle-of-attack or angle of incidence of the water flow F and the aft body 16 and tail 18 on the other side of the lure 10 decreases. This decrease in the angle-of-attack causes the water flow F to move slower, which in turn results in a larger, slower and higher water pressure eddy or swirl Q2 adjacent the tail 18 on the other side of the lure 10. The lower water pressure eddy or swirl Q1 is illustrated in FIG. 7 as a smaller, tighter swirl.

The reduced water pressure of Q1 tends to draw the tail 18 towards that side until the angle-of-attack becomes too great and the hydrofoil stalls. When the tail hydrofoil stalls, the low-pressure swirl Q1 collapses, and the tail 18 is drawn back to the other side (toward Q2) in a smooth, fluid motion, where inertia will tend to draw the tail 18 past a neutral tail position (where the lure body is completely straight). When the tail 18 is drawn to the other side a new low-pressure swirl Q1 is formed where Q2 used to be. This 'swimming' cycle of the tail 18 is repeated until the lure 10 drawn out of the water.

The low-pressure swirl Q1 may be enhanced or manipulated through the selection of particular angles of the faces, i.e., the lateral faces 26, 27, 32, 33, on the tail, and the angles which the lateral faces form where they meet the dorsal face 28, the ventral face 30 and the tip faces 34, 35. The low-pressure swirl Q1 may further be enhanced by relatively rounded or sharp angles where the faces meet. As a non-limiting example, the angle φ describes the relative angle between the aft body 16 and the maximum flare of the lateral surfaces 26, 27, 32, 33, as is illustrated in FIG. 2. A more open, obtuse angle (approaching 180 degrees) will not create as large a low-pressure swirl Q1 as an obtuse angle which is less open. Angles may be selected based on the desired swimming performance characteristics, e.g., 110°-120°, 120°-130°, 130°-140°, 140°-150°, 150°-160°, 160°-170°, 170°-180°. Angles closer to a right angle will be more aggressive in creating low-pressure swirls Q1, but will may also be more likely to stall more quickly, but may increase the cyclic swimming rate of the tail.

Various factors may be used to determine the exact placement of the fishing line eye 36, fish hook eye 38, buoyancy insert 40 and the angles or orientations of the channel grooves 24 and various faces of the tail 26, 27, 28, 30, 32, 33. Such factors may include, but are not limited to the desired or intended depth of the lure 10 when it is being retrieved and drawn through the water, the diameter and drag characteristics of the fishing line, the mass and drag characteristics of the fish hook(s) attached to the lure 10, the mass of the buoyancy insert 40 and it effect, on the center of gravity of the lure 10, the desired rate of retrieve, i.e., the intended velocity of the lure 10 through the water, and other factors.

As illustrated in FIG. 8, the motion of the tail 18 is limited to horizontal motion. There is no vertical component to the tail's motion. This is due to the channel groove 24, primarily. The horizontal-only motion may be further reinforced through the careful selection of the angles and orientations of the various faces 26, 27, 28, 30, 32, 33 of the tail 18.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A fishing lure comprising a soft, flexible fish-shaped body having a forward body portion having a maximum width and a maximum height which tapers to an aft body portion having a width and height that are reduced compared with the maximum width and height of the forward body portion; and a swimming tail portion flexibly connected to the aft body portion at a pivot, wherein the swimming tail includes a flared configuration, wherein the tail increases in width and height toward a tail tip as compared with the aft body portion, and a central channel groove generally parallel to a long axis of the lure, the long axis being normal to both a width and height of the lure, the channel groove extending to the tail tip and maintaining a smaller width dimension as compared to adjacent flared portions of the tail, wherein the tail portion comprises a plurality of faces, wherein the tail includes a right pair of lateral faces and a left pair of lateral faces, each pair of faces joined at an angle at the central channel groove, and each pair of faces including an upper face and a lower face, wherein an upper right lateral face is joined at an angle at the pivot to the aft body portion, wherein an upper left later face is joined at an angle at the pivot to the aft body portion, wherein a lower right lateral face is joined at an angle at the pivot to the aft body portion, wherein a lower left lateral face is joined at an angle at the pivot to the aft body portion, wherein each lateral face is generally planar, having an uppermost edge of the upper right lateral face and a rearmost edge of the upper right lateral face meeting at a point and lying on a same plane, further having an uppermost edge of the upper left lateral face and a rearmost edge of the upper left lateral face meeting at a point and lying on a same plane, further having a lowermost edge of the lower right lateral face and a rearmost edge of the lower right lateral face meeting at a point and lying on a same plane, further having a lowermost edge of the lower left lateral face a rearmost edge of the lower left lateral face meeting at a point and lying on a same plane, wherein water flow across the tail is guided through the central channel groove and across the flared portions of the tail to provide vertically-balanced water flow across the tail and to produce a uniform horizontal swimming movement of the tail.

2. The fishing lure of claim 1, wherein the channel groove increases in width toward the tail tip while maintaining a smaller width dimension as compared to adjacent flared portions of the tail.

3. The fishing lure of claim 1, wherein the upper lateral faces are connected across a top of the tail by a dorsal face.

4. The fish lure of claim 1, wherein the lower lateral faces are connected across a bottom of the tail by a ventral face.

5. The fish lure of claim 1, wherein the upper lateral faces are connected across an upper tail tip by an upper tip face.

6. The fish lure of claim 1, wherein the lower lateral faces are connected across a lower tail tip by a lower tip face.

7. The fish lure of claim 1, wherein the upper and lower lateral faces are connected across a tail tip by a combined tip face.

8. The fish lure of claim 7, wherein the combined tip face is rounded.

9. The fishing lure of claim 1, wherein the body and tail are formed as a single piece of a flexible homogenous material.

10. The fishing lure of claim 1, further comprising a buoyancy insert inside the body portion.

11. The fishing lure of claim 1, further comprising a fishing line eye in a forward portion of the body.

12. The fishing lure of claim 11, further comprising a fish hook eye connected to the fishing line eye.

13. A fishing lure consisting of a soft, flexible fish-shaped body having a forward body portion having a maximum width and a maximum height which tapers to an aft body portion having a width and height that are reduced compared with the maximum width and height of the forward body portion; and a swimming tail portion flexibly connected to the aft body portion at a pivot, wherein the swimming tail includes a flared configuration, wherein the tail increases in width and height toward a tail tip as compared with the aft body portion, and a central channel groove generally parallel to a long axis of the lure, the long axis being normal to both a width and height of the lure, the channel groove extending to the tail tip and maintaining a smaller width dimension as compared to adjacent flared portions of the tail, wherein the tail portion consists of a plurality of faces, wherein the tail includes a right pair of lateral faces and a left pair of lateral faces, each pair of faces joined at an angle at the central channel groove, and each pair of faces including an upper face and a lower face, wherein an upper right lateral face is joined at an angle at the pivot to the aft body portion, wherein an upper left later face is joined at an angle at the pivot to the aft body portion, wherein a lower right lateral face is joined at an angle at the pivot to the aft body portion, wherein a lower left lateral face is joined at an angle at the pivot to the aft body portion, wherein each lateral face is generally planar, having an uppermost edge of the upper right lateral face and a rearmost edge of the upper right lateral face meeting at a point and lying on a same plane, further having an uppermost edge of the upper left lateral face and a rearmost edge of the upper left lateral face meeting at a point and lying on a same plane, further having a lowermost edge of the lower right lateral face and a rearmost edge of the lower right lateral face meeting at a point and lying on a same plane, further having a lowermost edge of the lower left lateral face a rearmost edge of the lower left lateral face meeting at a point and lying on a same plane, wherein water flow across the tail is guided through the central channel groove and across the flared portions of the tail to provide vertically-balanced water flow across the tail and to produce a uniform horizontal swimming movement of the tail.

* * * * *